Feb. 25, 1964 E. E. DUHAMEL 3,121,975
PORTABLE GREENHOUSE
Filed May 15, 1963

INVENTOR
EUGENE E. DUHAMEL
BY
*Barlow & Barlow*
ATTORNEYS

United States Patent Office 3,121,975
Patented Feb. 25, 1964

3,121,975
PORTABLE GREENHOUSE
Eugene E. Duhamel, P.O. Box 19, Sheffield, Pa.
Filed May 15, 1963, Ser. No. 280,596
4 Claims. (Cl. 47—17)

This invention relates to a portable greenhouse such as may be utilized for the starting of seeds of various plants.

One of the objects of this invention is to provide a suitable device so that small plants may be easily started in the home or at such locations where great room is not available.

Another object of the invention is to provide a simple device which may serve to contain moisture better than were the growing medium exposed to the circulation of air about it.

Another object of the invention is to provide a device which, although enclosed, still will be capable of obtaining the sun for growing purposes.

Another object of the invention is to provide a greenhouse which may have various sizes to be utilized as the seeds grow into plants of increasing sizes.

With these and other objects in view, the invention consists of certain novel features of construction as will be more fully described and particularly pointed out in the appended claims.

In proceeding with this invention, I provide a container which is conveniently here shown as circular in shape, although it may be of any shape, and form the edge of this container with a groove preferably opening downwardly. In this groove there may be placed the enlarged edge of a transparent flexible cover which may be of varying depths as is necessary for plant growth. Within the container there is located some growing medium such as dirt or a humus, and through the container and extending upwardly through the growing medium there is an air conduit which is controlled by an air valve so that air may be inserted through the conduit to blow the flexible cover up into a dome-like form away from the growing medium and providing an arrangement so that moisture may be kept within the enveloping cover.

Figure 1:
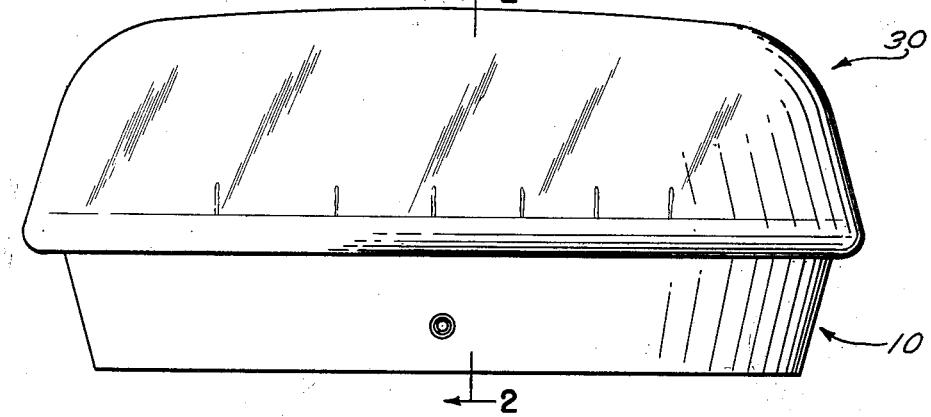
FIG. 1 is an elevation of the greenhouse.
Figure 2:
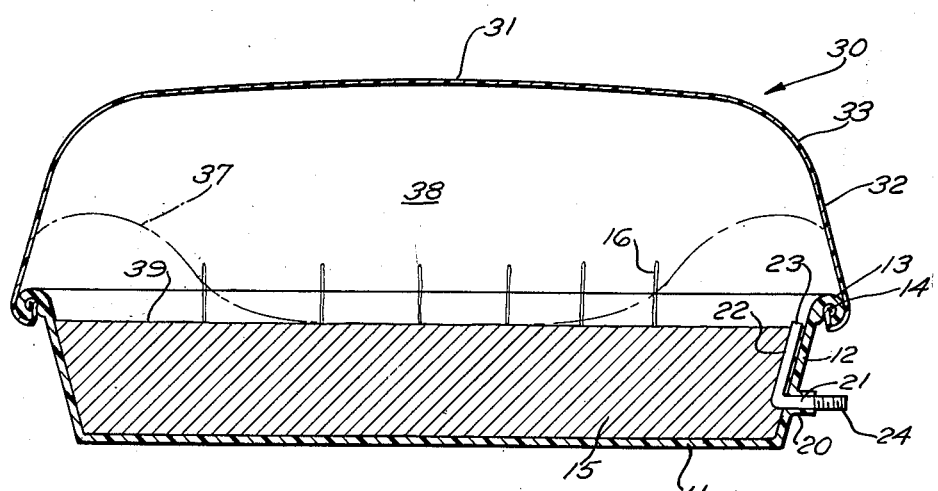
FIG. 2 is a section on line 2—2 of FIG. 1.
Figure 3:
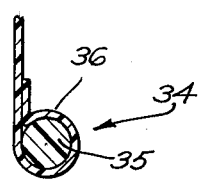
FIG. 3 is a sectional view of a fragmental portion showing the edge of the flexible cover.
Figure 4:
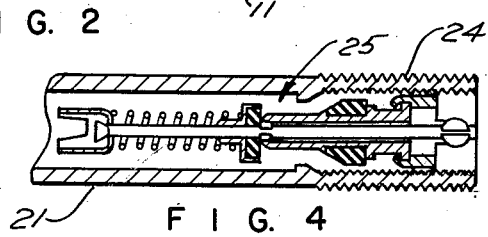
FIG. 4 is a sectional view on a greatly enlarged scale through the air conduit showing the air valve therein.

With reference to the drawings, 10 designates generally a container of dish-like form which is circular in shape having a bottom wall 11 and a circular side wall 12 which flares slightly outwardly. The upper edge 13 of this side wall is formed with an outward roll providing a groove 14 which opens downwardly. The edge may be thickened slightly as the container is molded from a suitable plastic so as to give it some strength. Within the container there is a growing medium 15 which may be of dirt or some humus or both into which seeds may be placed for sprouting and growing into a form such as shown at 16 in FIG. 2.

The side wall 12 is provided with a boss 20 extending outwardly therefrom, and through this boss there extends a conduit 21 which is bent upwardly as at 22 so that its upper end 23 will be located above the humus or growing medium 15, while its outer end 24 will extend out beyond the side wall and may be threaded for a cap if desired. Within this tube there is located a valve 25 for the control of air which will be of the general type of a bicycle valve so that, when pressure is applied, air may be passed in through the tube and extend upwardly to pass out through the upper end 23 thereof. The valve will close by spring pressure to hold the air within under pressure.

A transparent cover designated generally 30 has a top wall 31 and sides 32 curving downwardly as at 33 and is provided at its lower edge designated generally 34 with an enlarged portion which may be conveniently formed by inserting a flexible cylindrical strip 35 within the roll portion 36 of the edge 34 with the whole strip and roll sealed so as to provide a thickened edge which will be of a size which will be a little larger than the downward opening from the groove 14; thus as it is forced into the groove, it will be snugly bound therein all around the edge of the container. After the cover is thus secured in position, it will lay in somewhat the form of the dotted line showing at 37 in FIG. 2, but after air has been inserted therein, the cover will take the form shown in full lines, there being an airtight fit at the edge of the side wall. It will be apparent that the depth of the wall 32 may be varied so that a shallow cover may be at first provided with very little air in the space 38, whereas as the plant such as 16 grows larger, this cover may be changed to one having a greater depth at 32 so as to be higher above the upper edge 39 of the growing medium.

I claim:

1. A portable greenhouse comprising a generally rigid container having a bottom and side walls, a seed growing medium substantially filling said container, an air conduit passing through a side wall of said container near the bottom thereof below the top of said medium and extending to a point above said medium, a flexible cover for said container, and cooperating means between an edge of said cover and the side wall of said container to seal the edge of the cover to said container so that air under greater than atmospheric pressure may be held between said cover and said medium and means for inflating said flexible cover.

2. A portable greenhouse as in claim 1 wherein said flexible cover is transparent.

3. A portable greenhouse as in claim 1 wherein said conduit contains an air valve to control the flow of air therein.

4. A portable greenhouse comprising a container having a bottom and side walls, a seed growing medium in said container, a flexible cover for said container, and cooperating means between an edge of said cover and the side wall of said container to seal the edge of the cover to said container so that air under greater than atmospheric pressure may be held between said cover and said medium comprising a groove in the edge of said side wall and a bead on the edge of said cover to snap into said groove and means for inflating said flexible cover.

References Cited in the file of this patent

UNITED STATES PATENTS

| | | |
|---|---|---|
| 2,720,725 | Peerless | Oct. 18, 1955 |
| 2,782,794 | White | Feb. 26, 1957 |
| 2,910,994 | Joy | Nov. 3, 1959 |